July 31, 1951     B. CHANCE     2,562,295

SAWTOOTH SYNCHRONIZING CIRCUITS

Filed Nov. 6, 1945

*INVENTOR.*
BRITTON CHANCE
BY
*William D. Hall.*
ATTORNEY

Patented July 31, 1951

2,562,295

UNITED STATES PATENT OFFICE 2,562,295

SAWTOOTH SYNCHRONIZING CIRCUITS

Britton Chance, Cambridge, Mass., assignor, by mesne assignments, to the United States of America as represented by the Secretary of War Application November 6, 1945, Serial No. 627,044

2 Claims. (Cl. 250—27)

This invention relates to electrical circuits and more particularly to sweep circuits for cathode ray indicators.

In the cathode ray indicators of radio object-locating systems, it is customary to apply a voltage having a sawtooth waveform to the deflecting means for causing the electron beam to trace a range sweep. The period of the range sweep may be selected in accordance with the maximum range desired. Where the sawtooth circuit is triggered at relatively short intervals, it is desirable that some provision be made to insure that the circuit returns to its quiescent state, as measured by a fixed potential on a timing element, between successive range sweeps.

It is an object of the present invention to afford a variable width desensitising gate of such duration as to enable the sawtooth circuit to be completely restored to its quiescent state following generation of a sawtooth voltage before it can be triggered to start a new sawtooth. This is of considerable importance in maintaining the accuracy of sawtooth timing circuits.

Figure 1:
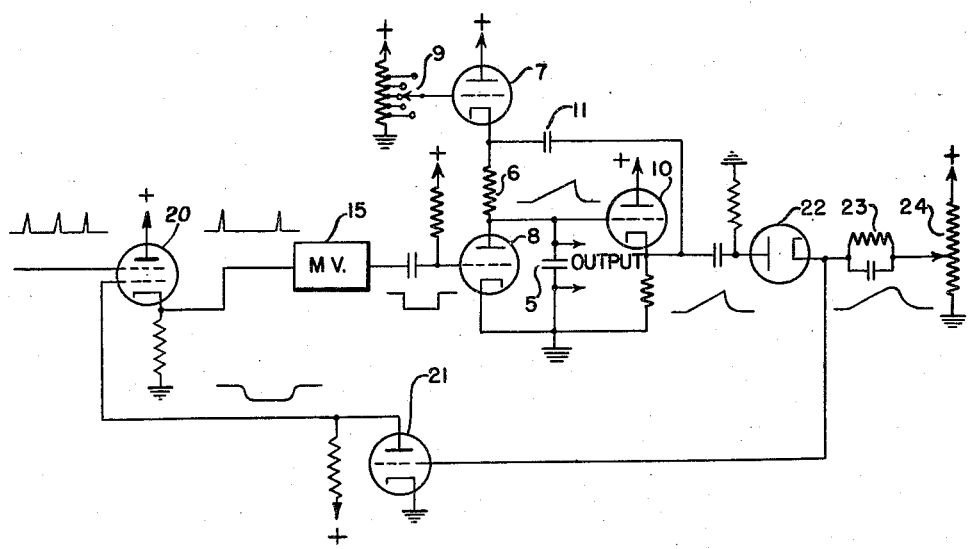
Figure 2:
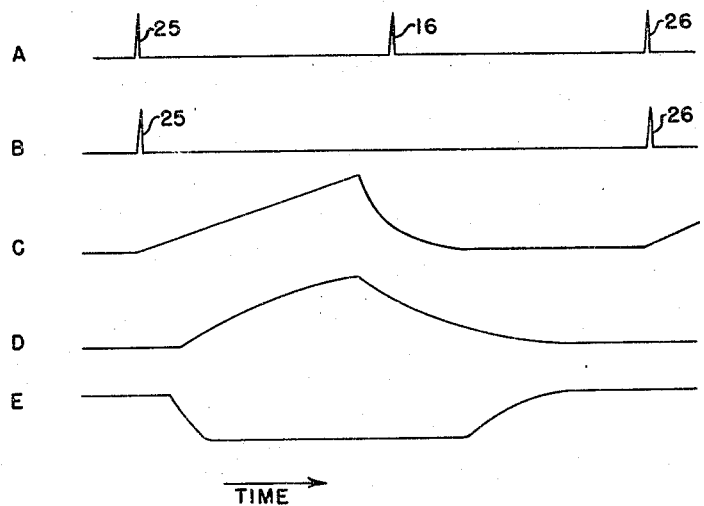

Other objects, features and advantages of this invention will suggest themselves to those skilled in the art and will become apparent from the following description of the invention taken in connection with the accompanying drawing in which:

Fig. 1 is a schematic illustration of an elementary sawtooth circuit embodying the principles of the present invention; and Fig. 2 is a set of waveforms drawn to the same time base and showing certain voltage relationships in the circuit.

A typical sawtooth generating circuit to which the present invention may be applied is shown schematically in Fig. 1. This circuit comprises a timing capacitor 5, one terminal of which is grounded, the other terminal thereof being connected in series with a resistor 6 to the cathode of a tube 7. Positive potential is applied to the plate of tube 7 from a suitable source thereof (not shown). A switch tube 8 is connected across the capacitor 5, the cathode of tube 8 being grounded. So long as the tube 8 is in a non-conducting state, the capacitor 5 will charge at a rate determined by the potential on the grid of tube 7. This grid potential may be varied by any suitable means such as a range switch 9. The charge potential on the capacitor 5 is applied to the grid of cathode follower tube 10, and a portion of the output of the cathode follower 10 is fed back through a capacitor 11 to the cathode of tube 7 to improve the linearity of the sawtooth voltage furnished by the capacitor 5. The output of the sawtooth generating circuit just described is taken from the terminals of the capacitor 5 and is utilized to sweep the electron beam in the cathode ray indicator (not shown).

For timing the range sweeps, trigger pulses are supplied by a suitable timer, these trigger pulses having a waveform such as that shown in Fig. 2A. The triggers generally are timed in relation to the transmission of search pulses by the radio object-locating system. A multivibrator 15 generates a negative gate voltage when triggered by a trigger pulse, and this gate voltage is applied to the grid of switch tube 8. Normally a positive potential is applied to the grid of tube 8 so that this tube is conductive and effectively short circuits the capacitor 5. When the gate voltage is applied, however, the tube 8 is cut off to remove the shunt from the capacitor 5 and capacitor 5 commences to charge, initiating a range sweep. When the sweep voltage attains a predetermined level, which generally is the same for all ranges, action takes place in the circuit to terminate the sweep by restoring the multivibrator 15 to its quiescent state, thus removing the negative gate from tube 8. Any suitable means well known in the art may be employed to effect this terminating action, such means not being germane to the present invention.

It is desirable that the sawtooth generating circuit be in a quiescent state, as measured by a predetermined potential on the capacitor 5, before each range sweep commences. For convenience the circuit condition during sweep is referred to as the generating state. Referring to Fig. 2C which shows a typical sawtooth wave produced by the circuit, it is seen that the trigger pulses, Fig. 2A, may occur so rapidly in relation to the sawtooth voltage that the capacitor 5 is still in a partially charged condition or the circuit in a restoring state when a trigger pulse such as 16 occurs. If a pulse such as 16 were permitted to trigger the multivibrator 15, a new sawtooth would be initiated at a voltage level higher than the quiescent value, thus introducing an error into the range indication. This would be particularly true at the longer ranges where a comparatively large time interval is required to perform the range sweep and restore the circuit to its quiescent state. Therefore, it is desirable that the application of trigger pulses to the multivibrator 15 be suspended during the time when a sawtooth voltage is being generated and the circuit is being restored to its quiescent condition. The purpose of the present invention is to select the trigger pulses which should be effective in producing the sawtooth voltages.

For this purpose a pulse selector 20, Fig. 1, is inserted between the multivibrator 15 and the input source of trigger pulses. This selector 20 may comprise a vacuum tube stage having two control grids and capable of being controlled from two sources, one of which is the input trigger pulse generator. The other control source is the output of cathode follower 10 from which a voltage is derived and applied to the pulse selector 20. For this purpose there is provided a loop including an inverter stage 21 connected to the cathode of a diode tube 22, the plate of tube 22 being capacity-coupled to the output of cathode follower 10. A parallel resistor-capacitor combination 23 connects the cathode of diode 22 to an adjustable potential source such as potentiometer 24, one terminal of which is grounded. The voltage appearing at the output of cathode follower 10, having a waveform similar to that shown in Fig. 2C, is applied to the diode 22, producing a positive voltage wave across the resistor-capacitor 23, as represented in Fig. 2D. The bias set by potentiometer 24 delays the first deflection of the waveform in Fig. 2D but has no effect on the operation except to avoid excessive loading through diode 22. The time constant of circuit 23 modifies the shape of this curve, the important factor being a lengthening of the curve. This voltage is fed back to the inverter 21 and a corresponding negative voltage or desensitising gate as shown in Fig. 2E is produced by inverter 21 and is applied to the pulse selector 20, driving this stage to cutoff. An ordinary amplifier functions as inverter merely to reverse polarity, but the shape of this curve indicates that the inverter 21 is overdriven and clips the wave. The negative output pulse, Fig. 2E, from the inverter 21 may be applied to one grid of the selector 20, while the trigger pulses, Fig. 2A, are applied to another grid thereof. The duration of this desensitising gate is adjusted to include the time required to reduce the potential on the capacitor 5 to its quiescent value.

To summarize the foregoing, the sawtooth voltage, Fig. 2C, which is initiated by a trigger pulse such as 25, Fig. 2A, causes a negative voltage or desensitising gate, Fig. 2E, to be fed back to the pulse selector 20, thus preventing any trigger pulses such as 16 from being applied to the multivibrator 15 until the sawtooth circuit is restored to its quiescent condition. When this has occurred, the sawtooth circuit will again respond to a trigger pulse such as 26 to start a new range sweep. Any trigger pulses such as 16 intermediate the pulses 25 and 26 will be eliminated by the pulse selector 20, the output of which therefore appears as shown in 2B.

While there has been described what is at present considered to be the preferred embodiment of this invention, it will be obvious to those skilled in the art that various changes and modifications may be made therein without departing from the scope of the invention.

The invention claimed is:

1. In a sawtooth generating circuit having a sweep capacitor, means to vary the charge on said capacitor at a rate to provide a sweep voltage, means to quickly restore said charge to a quiescent value, a source of synchronizing pulses, and responsive to synchronizing pulses from said source means to disable said restoring means for a period to permit generation of said sweep voltage, said synchronizing pulses having a given repetition frequency, means responsive to said sweep voltage and including a time constant circuit to provide a control voltage terminating after said charge is restored, and means responsive to said control voltage to render ineffective synchronizing pulses occurring at an undesired time, whereby said synchronized means is ineffective until said charge is restored.

2. A wave generating system, comprising a saw tooth voltage generating circuit including a capacitor, switch means for controlling the charging of said capacitor, means for supplying keying pulses for controlling said switch means, a source of synchronizing pulses for said keying pulse supplying means, circuit means for translating the saw tooth voltage from said generator including means for lengthening the duration of said saw tooth formed voltage, and means for deriving from said lengthened saw tooth formed voltage a desensitizing gate voltage and for applying the same to said source, whereby synchronizing pulses occurring substantially during said lengthened saw tooth are suppressed.

BRITTON CHANCE.

REFERENCES CITED

The following references are of record in the file of this patent:

UNITED STATES PATENTS

| Number | Name | Date |
| --- | --- | --- |
| 2,427,523 | Dolberg et al. | Sept. 16, 1947 |

OTHER REFERENCES

"Ultra High Frequency Techniques," July 1942, page 190, Figure 4-29 by Brainerd et al.